(12) United States Patent
Minami (10) Patent No.: US 7,485,368 B2
(45) Date of Patent: Feb. 3, 2009

(54) ELECTROPHORETIC PARTICLES, PRODUCTION PROCESS THEREOF, AND ELECTROPHORETIC DISPLAY DEVICE USING ELECTROPHORETIC DISPERSION LIQUID

(75) Inventor: Masato Minami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 11/138,486

(22) Filed: May 27, 2005

(65) Prior Publication Data

US 2005/0267235 A1 Dec. 1, 2005

(30) Foreign Application Priority Data

May 31, 2004 (JP) ............................. 2004-162471

(51) Int. Cl.
*B32B 5/16* (2006.01)
(52) U.S. Cl. ....................... 428/403; 428/404; 428/405; 428/406; 428/407; 427/385.5; 427/388.4; 427/388.5
(58) Field of Classification Search ................. 428/403, 428/404, 405, 406, 407; 427/385.5, 388.4, 427/388.5
See application file for complete search history.

(56) References Cited

U.S. PATENT DOCUMENTS

| 3,612,758 A | 10/1971 | Evans et al. ............... 178/5.4 R |
| 6,525,866 B1 * | 2/2003 | Lin et al. ..................... 359/296 |
| 6,741,386 B2 | 5/2004 | Minami ...................... 359/296 |
| 6,853,477 B2 * | 2/2005 | Nomoto et al. ............. 359/296 |
| 2003/0206330 A1 * | 11/2003 | Nomoto et al. ............. 359/296 |
| 2005/0227155 A1 | 10/2005 | Minami ........................ 430/37 |
| 2005/0267252 A1 | 12/2005 | Minami ...................... 524/556 |
| 2005/0267263 A1 | 12/2005 | Minami ...................... 525/242 |

FOREIGN PATENT DOCUMENTS

JP 61-25136 6/1986

* cited by examiner

*Primary Examiner*—Leszek Kiliman
(74) *Attorney, Agent, or Firm*—Fitzpatrick, Cella, Harper & Scinto (57) ABSTRACT

Electrophoretic particles are constituted by core particles comprising a first polymer, and a pigment dispersed in the core particles. To the pigment, a second polymer is grafted, and at the surface of core particle, a shell layer for suppressing agglomeration of the core particles is disposed. The electrophoretic particles are excellent in a degree of coloring and dispersibility compared with conventional electrophoretic particles.

8 Claims, 4 Drawing Sheets

ELECTROPHORETIC PARTICLES, PRODUCTION PROCESS THEREOF, AND ELECTROPHORETIC DISPLAY DEVICE USING ELECTROPHORETIC DISPERSION LIQUID

FIELD OF THE INVENTION AND RELATED ART

The present invention relates to electrophotographic particles, a production process of the electrophoretic particles, a production process of the electrophoretic particles, an electrophoretic dispersion liquid containing the electrophoretic particles, and an electrophoretic display device using the electrophoretic dispersion liquid.

In recent years, with development of information equipment, the needs for low-power and thin display devices have grown, so that extensive study and development have been made on display devices fitted to these needs. Of these display devices, liquid crystal display devices have been known and developed actively as a display device capable of meeting the needs by electrically controlling alignment of liquid crystal molecules to change optical characteristic of the liquid crystal and has been brought into the commercial stage.

However, such liquid crystal display devices are accompanied with such problems that they have poor viewability of characters on a picture area due to a viewing angle or reflection light and that an eyestrain problem caused by flickering, low luminance, etc., of a light source is not sufficiently solved.

As one of the display devices, an electrophoretic display device has been proposed in U.S. Pat. No. 3,612,758.

In the electrophoretic display device, a multiplicity of electrophoretic particles which are positively charged and colored are dispersed in a space between a pair of substrates, each provided with an electrode, together with an electrophoretic dispersion liquid which is filled in the space and colored a color different from the color of the electrophoretic particles. In the space, a partition wall is formed so that it divides the space into a multiplicity of pixels along a planar direction of the substrates. By forming such a partition wall, it is possible to define the space between the pair of substrates while preventing localization of the electrophoretic particles.

In such an electrophoretic display device, when a positive-polarity voltage is applied to an observer's side electrode and a negative-polarity voltage is applied to an electrode on an opposite side, the positively charged electrophoretic particles are collected so as to cover the opposite side electrode, so that a color identical to the color of the electrophoretic dispersion liquid (dispersion medium) is displayed when the electrophoretic display device is observed from the observers side.

On the other hand, when a negative-polarity voltage is applied to the observer's side electrode and a positive-polarity voltage is applied to the opposite side electrode, the positively charged electrophoretic particles are collected so as to cover the observer's side electrode, so that a color identical to the color of the electrophoretic particles is displayed when the electrophoretic display device is observed from the observer's side.

By performing such a drive of the electrophoretic display device on a pixel-by-pixel basis, any image or character is displayed by a multiplicity of pixels.

As a production process of electrophoretic particles used in a conventional electrophoretic display device, Japanese Patent (Tokkou Sho) No. 61-25136 has proposed such a process that a pigment is mixed in a solution of a polymer in an organic solvent having high volatility, followed by baking, pulverization, etc., to coat the pigment with the polymer.

However, in the conventional production process, the pigment generally has poor dispersibility, so that it is very difficult to uniformly disperse the pigment in the polymer solution. As a result, the electrophoretic particles produced by such a production process have been accompanied with such a problem that the pigment agglomerates in the polymer and becomes nonuniform, thus resulting in a poor coloring degree of particle. Further, there also has arisen such a problem that the pigment is exposed at a surface of polymer particle, so that the resultant particles cause agglomeration.

SUMMARY OF THE INVENTION

An object of the present invention is to provide electrophotographic particles excellent in a degree of coloring and dispersibility compared with conventional electrophoretic particles.

Another object of the present invention is to provide a process for producing the electrophoretic particles an electrophoretic dispersion liquid containing the electrophotographic particles and an electrophoretic display device which uses the electrophoretic dispersion liquid to provide excellent display performances.

According to an aspect of the present invention, there is provided electrophoretic particles, comprising:
core particles comprising a first polymer, and
a pigment dispersed in the core particles,
wherein to the pigment, a second polymer is grafted, and at the surface of core particle, a shell layer for suppressing agglomeration of the core particles is disposed.

According to another aspect of the present invention, there is provided a process for producing electrophoretic particles containing a pigment, comprising:
a step of forming core particles by performing suspension polymerization of a composition comprising a pigment to which a polymer is grafted, a polymerization initiator, and a polymerizable monomer in a suspension medium, and
a step of forming a shell layer for suppressing agglomeration of the core particles at a surface of core particle.

According to the present invention, it is possible to provide electrophotographic particles excellent in a degree of coloring and dispersibility compared with conventional electrophoretic particles.

Further, it is also possible to provide a process for producing the electrophoretic particles an electrophoretic dispersion liquid containing the electrophotographic particles and an electrophoretic display device which uses the electrophoretic dispersion liquid to provide excellent display performances.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, preferred embodiments of the present invention will be described in detail with reference to the drawings.

The electrophoretic particles according to the present invention include core particles comprising a first polymer and a pigment dispersed in the core particles. To the pigment, a second polymer is grafted. Further, at a surface of core particle, a shell layer for suppressing agglomeration of the core particles is disposed.

Whether or not the agglomeration of the core particles is suppressed by the shell layer is judged by a difference of degree of agglomeration between the case of using the shell layer and the case of using no shell layer. In the present invention, the degree of agglomeration between core particles is sufficient so long as the agglomeration of a core particles is substantially suppressed. Accordingly, it should be understood that only the case where the core particles do not agglomerate at all is not necessarily intended in the present invention.

FIGS. 1(a) and 1(b) are schematic sectional views each showing an embodiment of an electrophoretic display device using electrophoretic particles according to the present invention.

Referring to FIG. 1(a), the electrophoretic display device includes a first substrate 1a provided with a first electrode 1c, a second substrate 1b provided with a second electrode 1d, and a partition wall 1g disposed so that the first and second substrates 1 and 2 are oppositely disposed with a predetermined spacing.

In a cell (space) defined by the first and second substrates 1a and 1b and the partition wall 1g, an electrophoretic dispersion liquid which at least comprises a plurality of electrophoretic particles 1e and an electrophoretic dispersion medium 1f. On each of the first and second electrodes, an insulating layer 1h is formed. A display surface of the electrophoretic display device is located on the second substrate 1b side.

FIG. 1(b) shows an electrophoretic display device using microcapsules. On a first substrate 1a, a plurality of microcapsules 1i each containing the electrophoretic dispersion liquid are disposed and covered with a second substrate 1b. In the case of using the microcapsules, an insulating layer 1h may be omitted. Other features are the same as in the case of the electrophoretic display device shown in FIG. 1(a).

Figure 1:
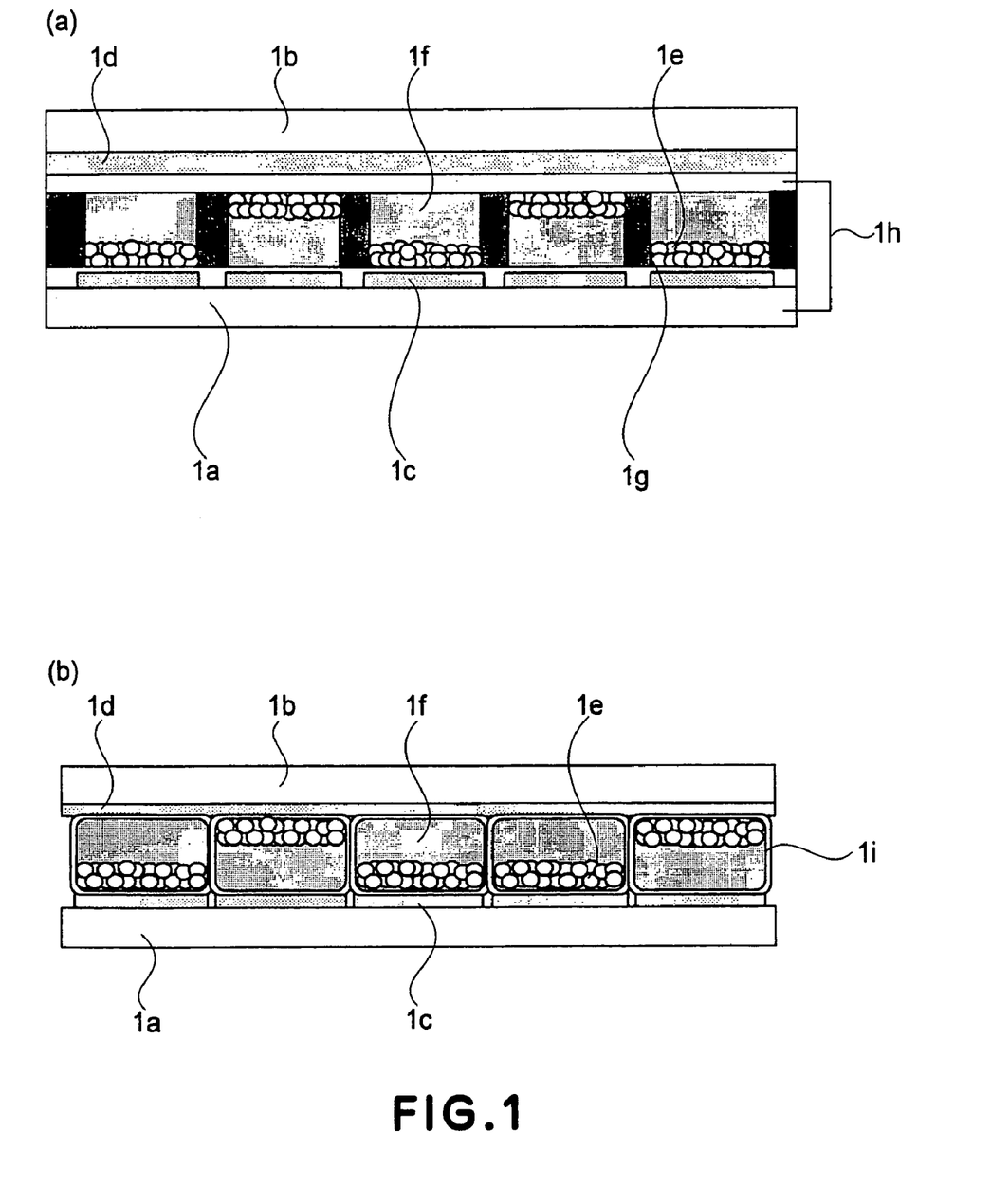
FIGS. 1(a) and 1(b) are schematic sectional views showing an embodiment of an electrophoretic display device using electrophoretic particles of the present invention.

In FIG. 1, the first electrode 1c is a pixel electrode and comprises a plurality of electrode portions which are independently capable of applying a desired electric field to the electrophoretic dispersion liquid in an associated cell (or microcapsule) of the respective cells. The second electrode 1d is a common electrode through which the same electric potential is applied to the entire display area.

The first electrode 1c (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 1e) in each of the cells groups.

The electrophoretic particles 1e in each individual cell (or microcapsule) are controlled by an electric field applied through the first electrode 1c, whereby at each pixel, the color (e.g., white) of the electrophoretic particles 1e and the color (e.g., blue) of the electrophoretic dispersion medium 1f are selectively displayed. By effecting such a drive on a pixel-by-pixel basis, it is possible to effect display of arbitrary images and characters by use of corresponding pixels.

Hereinbelow, constitutions, materials, production processes, or the like of the electrophoretic display device will be described.

(Constitution of Electrophoretic Display Device)

The first substrate 1a is formed of any insulating member, for supporting the electrophoretic display device, such as glass, plastic, or the like.

The first electrode 1c may be formed of a metal (vapor) deposition film of ITO (indium tin oxide), tin oxide, indium oxide, gold, chromium, etc., in a predetermined pattern through a photolithographic process. The second substrate 1b may comprise an insulating member, such as a transparent glass substrate or a transparent plastic substrate. The second electrode 5 may be a transparent electrode formed of ITO film or an organic electroconductive film.

The insulating layer 1h can be formed of a colorless transparent insulating resin, such as acrylic resin, epoxy resin, fluorine-based resin, silicone resin, polyimide resin, polystyrene resin, or polyalkene resin.

The partition wall 1g can be formed of a polymeric material through, e.g., a method wherein the partition wall is formed with a photosensitive resin through the photolithographic process, a method wherein the partition wall which has been prepared in advance is bonded to the substrate, a method wherein the partition wall is formed through molding, or the like.

The method of filling the electrophoretic dispersion liquid is not particularly limited but can be an ink jet method using nozzles.

(Microcapsule)

The microcapsule 1i containing therein the electrophoretic dispersion liquid described above can be prepared through a known method, such as interfacial polymerization, in situ polymerization, coacervation, or the like.

As a material for the microcapsule 1i, a high light-transmissive material may preferably be used. Examples thereof may include: urea-formaldehyde resin, melamine-formaldehyde resin, polyester, polyurethane, polyamide, polyethylene, polystyrene, polyvinyl alcohol, gelatin, their copolymers, and so on.

The method of forming the microcapsules on the first substrate 1a is not particularly restricted but may be an ink jet method using nozzles.

Incidentally, in order to prevent positional deviation of the microcapsule 1i disposed on the substrate, a light-transmissive resin binder may be filled in a gap between adjacent microcapsules to fix the microcapsules on the substrate. As the resin binder, it is possible to use a water-soluble polymer, such as polyvinyl alcohol, polyurethane, polyester, acrylic resin, silicone resin, etc.

In the case of sealing a spacing between the first and second substrates 1a and 1b, the spacing may preferably be sealed under pressure so that the microcapsule 1i has such a shape that a horizontal length is longer than a vertical length with respect to the first substrate 1a (FIG. 1(b)).

(Electrophoretic Dispersion Medium)

As the electrophoretic dispersion medium 1f, it is possible to use a liquid, which is high insulative and colorless and transparent, including: aromatic hydrocarbons, such as toluene, xylene, ethylbenzene and dodecylbenzene; and aliphatic hydrocarbons, such as hexane, cyclohexane, kerosine, normal paraffin and isoparaffin; etc. These may be used singly or in mixture of two or more species.

(Dye)

The electrophoretic dispersion medium $1f$ may be colored with oil soluble dye having a color of R (red), G (green), B (blue), C (cyan), M (magenta), Y (yellow), etc. Examples of the dye may preferably include azo dyes, anthraquinone dyes, quinoline dyes, nitro dyes, nitroso dyes, penoline dyes, phthalocyanine dyes, metal complex salt dyes, naphthol dyes, benzoquinone dyes, cyanine dyes, indigo dyes, quinoimine dyes, etc. These may be used in combination.

Examples of the oil soluble dye may include Vali Fast Yellow (1101, 1105, 3108, 4120), Oil Yellow (105, 107, 129, 3G, GGS), Vali Fast Red (1306, 1355, 2303, 3304, 3306, 3320), Oil Pink 312, Oil Scarlet 308, Oil Violet 730, Vali Fast Blue (1501, 1603, 1605, 1607, 2606, 2610, 3405). Oil Blue (2N, BOS, 613), Macrolex Blue RR, Sumiplast Green G, Oil Green (502, BG), etc. A concentration of these dyes may preferably be 0.1-3.5 wt. %, per the electrophoretic dispersion medium $1f$.

(Electrophoretic Particles)

The electrophoretic particles $1e$ of the present invention are, as described above, electrophoretic particles comprising firs polymer fine particles (core particles) and a pigment dispersed therein uniformly. To the pigment, a second polymer is grafted. The core particles comprise a polymer of a composition containing the pigment uniformly dispersed in a polymerizable monomer.

At a surface of core particle, a shell layer is formed so as to prevent or suppress the agglomeration between the core particles.

The electrophoretic particles $1e$ of the present invention is produced by forming a core comprising polymer fine particles and a pigment uniformly dispersed in the polymer fine particles through suspension polymerization of a composition for core comprising a polymer-grafted pigment, a polymerization initiator for core, and a polymerizable monomer for core in an aqueous suspension medium containing a suspension stabilizer, and then polymerizing a system comprising the core and a composition for shell comprising a polymerizable monomer for shell and a polymerization initiator for shell, thereby to form a shell layer at a surface of the core.

(Formation of Core)

The core of the electrophoretic particles $1e$ of the present invention can be prepared by the above described production process.

More specifically, a core composition comprising a second polymer-grafted pigment, a polymerization initiator for core, a polymerizable monomer for core (as a starting material of a first polymer) is uniformly dispersed by a dispersion apparatus, such as a shearing-type dispersion apparatus, such as a homogenizer, a homomixer, a biomixer, and the like; a media-type dispersion apparatus, such as a ball mill, an atriter, a sand mill, and the like; an ultrasonic dispersion apparatus; etc. The above described core composition is placed in an aqueous suspension medium containing a suspension stabilizer and formed into particles having a particle size close to a desired particle size by a dispersion apparatus, such as a homogenizer, a homomixer, a line mixer, or the like.

The resultant suspension liquid is polymerized in an atmosphere of inert gas, such as nitrogen (gas), argon (gas), and the like. A polymerization temperature varies depending on the kind of polymerization initiator for core but may preferably be in the range of about 50-90° C. A polymerization time may preferably be 0.5-30 hours, more preferably 2-10 hours. As a result of the polymerization, colorant-containing particles as the core are obtained.

(Suspension Stabilizer)

As the suspension stabilizer contained in the above described aqueous suspension medium, it is possible to use compounds including: phosphate, such as calcium phosphate, magnesium phosphate, and aluminum phosphate; pyrophosphates, such as calcium pyrophosphate, magnesium pyrophosphate, aluminum pyrophosphate, and zinc pyrophosphate; poorly water-soluble inorganic compounds, such as calcium carbonate, magnesium carbonate, calcium hydroxide, magnesium hydroxide, aluminum hydroxide, calcium sulphate, barium sulphate, and colloidal silica; and water-soluble polymers, such as polyvinyl alcohol, carboxymethyl cellulose, hydroxyethyl cellulose, methyl cellulose, starch, and sodium polyacrylate.

The suspension stabilizer may preferably be added in an amount of 0.01-30 wt. %, more preferably 0.1-20 wt. % with respect to the core composition.

(Surfactant)

In the suspension medium, it is possible to add the anionic surfactant, the cationic surfactant, the nonionic surfactant, the amphoteric surfactant, etc., as desired.

As the anionic surfactant, it is possible to use alkyl sulphate, alkyl sulfonate, fatty acid salt, polyoxyethylene alkylphenyl ether sulphate, polyoxyethylene alkyl sulphate, alkylnaphthalene sulfonate, alkane sulfonate, alkyl phosphate, etc.

As the cationic surfactant, it is possible to use alkylamine salt, quaternary ammonium salt, etc.

As the nonionic surfactant, it is possible to use polyoxyethylene alkylphenyl ether, polyoxyethylene alkyl ether, polyoxyethylene fatty acid ester, sorbitan fatty acid ester, polyoxysorbitan fatty acid ester, glycerin fatty acid ester, etc.

As the amphoteric surfactant, it is possible to use lauryldimethylamine oxide.

The surfactant may preferably be added in an amount of 0.1-10 wt. %, more preferably 0.05-5 wt. %, with respect to the polymerizable monomer for the core.

In order to prevent coalescence of the polymerized particles, a thickness such as glycerin, ethylene glycol, or the like may also be added in the suspension medium, as desired.

(Pigment)

As the pigment, it is possible to use an organic pigment, an inorganic pigment, etc.

Examples of organic pigment may include azo pigments, phthalocyanine pigments, quinacridone pigments, isoindolinone pigments isoindolin pigments, dioxazine pigments, perylene pigments, perinone pigments, thioindigo pigments, quinophthalone pigments, anthraquinone pigments, nitro pigments, and nitroso pigments. Specific examples thereof may include: red pigments, such as Quinacridone Red, Lake Red, Brilliant Carmine, Perylene Red, Permanent Red, Toluidine Red and Madder Lake; green pigments, such as Diamond Green Lake, Phthalocyanine Green, and Pigment Green; blue pigments, such as Victoria Blue Lake, Phthalocyanine Blue, and Fast Sky Blue; yellow pigments, such as Hansa Yellow, Fast Yellow, Disazo Yellow, Isoindolinone Yellow, an Quinophthalone Yellow; and black pigments, such as Aniline Block and Diamond Black.

Examples of the inorganic pigment may include: white pigments, such as titanium oxide, aluminum oxide, zinc oxide, lead oxide, and zinc sulphide; black pigments, such as carbon black, manganese ferrite block, cobalt ferrite black, and titanium black; red pigments, such as cadmium red, red iron oxide, and molybdenum red; green pigments, such as chromium oxide, viridian, titanium cobalt green, cobalt green, and victoria green; blue pigments, such as ultramarine blue, prussian blue, and cobalt blue; and yellow pigments, such as cadmium yellow, titanium yellow, yellow iron oxide, chrome yellow, and antimony yellow.

The pigment may preferably have an average particle size of 10-500 nm, more preferably 20-200 nm. Below 10 nm, a handling characteristic is undesirably lowered considerably. Above 500 nm, a degree of pigmentation of the pigment is desirably lowered and the resultant particles are unsuitable for electrophoretic particles of a smaller size.

(Polymer Grafting of Pigment)

An agglomeration power between the pigment particles is very larger than an affinity of the pigment for other media, so that it is difficult to disperse the pigment (particles) in the dispersion medium in the order of submicrons. However, in the case of grafting the polymer to the pigment, it is possible to obviate the agglomeration between pigment particles. The polymer grafting to the pigment means that the polymer is irreversibly connected to primary particle of the pigment or an agglomeration of several primary particle thereof. For this reason, in the case where the grafted polymer has a high affinity for the dispersion medium, it is possible to disperse the polymer-grafted pigment in the dispersion medium.

As a method of grafting the polymer to the pigment, it is possible to use conventionally known methods, such as a method of polymerizing a polymerizable monomer in the presence of the pigment; a method of reacting a polymer, which has a reactive group capable of reacting with a functional group present at a surface of pigment, with the pigment; a method wherein a radical generation group, such as azo group or peroxide group, is introduced to a surface of pigment, and the radical generation group is decomposed in the presence of a polymerizable monomer to generate a radical, thus effecting grafting of the polymerizable monomer to the pigment surface; and a method wherein a polymer having a radical generation group, such as azo group or peroxide group is thermally decomposed in the presence of pigment, and the resultant polymer radical is trapped by the pigment.

The polymer used for the grafting is not particularly limited so long as the polymer has a high affinity for the polymerizable monomer for core described below. Herein, the high affinity means that the polymer for grafting and the polymerizable monomer for core are excellent in mutual solubility without causing phase separation. For example, when the polymerizable monomer for core is a styrene-based monomer, the polymer for grafting may preferably be a styrene-based polymer. Further, when the polymerizable monomer for core is a (meth-)acrylate monomer, the polymer for grafting may preferably be a poly(meth-)acrylate. The polymer-grafted pigment may preferably used in an amount of 1-50 wt. % per the polymerizable monomer for core.

(Polymerizable Monomer for Core)

As the polymerizable monomer for core, it is possible to use various vinyl monomers. Examples thereof may include: styrene-based monomers, such as styrene, 2-methyl styrene, 3-methyl styrene, 4-methyl styrene, 2-ethyl styrene, 3-ethyl styrene, 4-ethyl styrene, 2-propyl styrene, 3-propyl styrene, 4-propyl styrene, 2-isopropyl styrene, 3-isopropyl styrene, 4-isopropyl styrene, 4-tert-butyl styrene, 2,3-dimethyl styrene, 3,4-dimethyl styrene, 2,4-dimethyl styrene, 2,6-dimethyl styrene, 2,3-diethyl styrene, 3,4-diethyl styrene, 2,4-diethyl styrene, 2,6-diethyl styrene, 2-methyl-3-ethyl styrene, 2-methyl-4-ethyl styrene, α-methyl styrene, 4-phenyl styrene 2-chlorostyrene, 3-chloro styrene, 4-chloro styrene, and 4-methoxy styrene; (meth-)acrylate monomers, such as methyl (meth-)acrylate, ethyl (meth-)acrylate, propyl (meth-)acrylate, isopropyl (meth-)acrylate, and n-butyl (meth-)acrylate; vinyl ether monomers, such as vinyl methyl ether, vinyl ethyl ether, and vinyl isobutyl ether; vinyl ketone monomers, such as vinyl methyl ketone, vinyl ethyl ketone, and vinyl hexyl ketone; N-vinyl compound monomers, such as N-vinyl pyrrole, N-vinylcarbazole, N-vinylindole, and N-vinyl pyrrolidone; vinyl acetate; (meth-)acrylonitrile; and (meth-)acrylamide. These monomers may be used singly or in combination of two or more species.

Further, it is also possible to use a cross linking agent, as desired, in combination with the polymerizable monomer for the core. Examples thereof may include: compounds, such as divinylbenzene, divinylnaphthalene, ethylene glycol di-(meth-) acrylate, diethylene glycol di-(meth-)acrylate, triethylene glycol di-(meth-)acrylate, tetraethylene glycol di-(meth-)acrylate, trimethylolpropane triacrylate, allyl (meth-)acrylate, 1,3-butanediol di-(meth-)acrylate, N,N-divinylaniline, and divinyl ether. These compounds may be used singly or in combination of two or more species.

The polymer grafted to the pigment and the polymerizable monomer for core have a high affinity, thus being liable to be uniformly dispersed.

(Polymerization Initiator for Core)

As the polymerization initiator for core, it is possible to use an oil-soluble azo-type or peroxide-type initiator generally used in suspension polymerization. Examples thereof may include: the azo-type initiators, such as 2,2'-azobisisobutylonitrile, 2,2'-azobis-2,4-dimethylvaleronitrile, 2,2'-azobis-2-methylbutyronitrile, 2,2'-azobis-2,3-dimethylbutyronitrile, 2,2-azobis-2,3,3-trimethylbutyronitrile, and 2,2'-azobis-2-isopropylbutyronitrile; and the peroxide-type initiators, such as benzoyl peroxide, orthochrolo benzoyl peroxide, orthomethoxy benzoyl peroxide, lauroyl peroxide, octanoyl peroxide, and methyl peroxide; etc.

The polymerization initiator for core may preferably be used in an amount of 0.1-10 wt. % with respect to the polymerizable monomers including the polymerizable monomer for core.

(Formation of Shell Layer)

The electrophoretic particles of the present invention can be obtained by adding a polymerizable monomer for shell and a polymerization initiator for shell to the above described core, followed by polymerization. More specifically, the polymerizable monomer for shell and the polymerization initiator for shell are added in the reaction system of the polymerization reaction for forming the core and are successively polymerized to form a shell layer at the core surface. The polymerizable monomer for shell and the polymerization initiator for shell may be added at the same time or separately added in this order.

In the case where the polymerizable monomer for shell is reacted with the core, it is preferable that the polymerizable monomer for shell is controlled to form droplets having a size of not more than an average particle size of the core particles. More specifically, in the case where the droplet size is larger than the average particle size of core, the polymerizable monomer for shell cannot be uniformly adsorbed by the core (particle) surface, thus being undesirable. In order to control the polymerizable monomer for shell so as to form droplets having the size of not more than the average particle size of core, a mixture of the polymerizable monomer for shell and the aqueous dispersion medium is finely dispersed by, e.g., an ultrasonic emulsifying machine or the like. The thus obtained dispersion liquid may preferably added to the reaction system in which the core is present. In this case, a polymerization conversion ratio of the polymerizable monomer for core in the core composition may preferably be not less than 80%, more preferably not less than 90%. Below 80%, the polymerizable monomer for core left in the reaction system in a relatively large amount is only copolymerized with the added polymerizable monomer for shell, thus undesirably failing to form effectively the shell layer at the core surface.

A polymerization temperature varies depending on the kind of the polymerizable monomer for core but may preferably about 50-90° C. A polymerization time may preferably 0.5-30 hours, more preferably 2-10 hours.

In the electrophoretic particles of the present invention, a ratio of core: shell may preferably be in a range of 60:40 to 99.9:0.1 in terms of a weight ratio of (polymerizable monomer for core):(polymerizable monomer for shell). When the polymerizable monomer for shell is used in an amount exceeding the above range, a degree of coloring of the electrophoretic particles $1e$ is undesirably lowered. On the other hand, the amount of the polymerizable monomer for shell is below the above range, a steric-exclusion effect of the shell cannot be undesirably achieved sufficiently. After the reaction, the resultant particles are recovered by an appropriate method, such as filtration, decantation, centrifugal separation, etc., followed by drying and classification to obtain the electrophoretic particles $1e$.

(Polymerizable Monomer for Shell)

The shell layer used in the present invention is constituted by a polymer having a high affinity for the electrophoretic dispersion medium $1f$, so that the shell layer has the effect of dispersing the resultant electrophoretic particles. More specifically, the shell layer in the present invention is expanded in the electrophoretic dispersion medium $1f$ to achieve the steric-exclusion effect for preventing the agglomeration of particles.

Accordingly, the polymerizable monomer for shell is required to provide a polymer having a high affinity for the above described electrophoretic dispersion medium $1f$. Here, the high affinity means that the resultant shell and the electrophoretic dispersion medium $1f$ are excellent in mutual solubility without causing phase separation. Examples of the polymerizable monomer for shell may include: 2-ethylhexyl (meth-)acrylate, heptyl (meth-)acrylate, octyl (meth-)acrylate, decyl (meth)-acrylate, dodecyl (meth-)acrylate, tetradecyl (meth-)acrylate, hexadecyl (meth-)acrylate, octadecyl (meth-)acrylate, 1-hexene, 1-heptene, 1-octene, 1-decene, etc. These monomers may be used singly or in mixture of two or more species.

(Polymerization for Shell)

In the formation of the shell layer, the polymerization initiator for shell used in combination with the polymerizable monomer for shell may preferably be a water-soluble polymerization initiator. More specifically, in the case of using the water-soluble polymerization initiator, the water-soluble polymerization initiator enters the polymerizable monomer for shell adsorbed at the core surface, so that the shell layer is easily formed at the core surface.

Examples of the polymerization initiator for shell may include: water-soluble polymerization initiator, such as potassium persulfate, ammonium persulfate, 2,2'-azobis(2-amidinopropane) dihydrochloride, 4,4'-azobis(4-cyanovaleric acid), 2,2'-azobis-2-methyl-N-1,1-bis(hydroxymethyl)-2-hydrox yethylpropioamide, etc. The polymerization initiator for shell may preferably be used in an amount of 0.1-10 wt. % per the polymerizable monomer for shell.

The electrophotographic particles $1e$ may preferably have an average particle size of 0.5-10 μm, more preferably 0.5-3 μm. When the average particle size exceeds 10 μm, display at high resolution cannot be performed. When the average particle size is less than 0.5 μm, it is undesirably difficult to produce the electrophoretic particles $1e$ of the present invention.

(Electrophoretic Dispersion Liquid)

The electrophoretic dispersion liquid at least contain the electrophoretic particles $1e$ and the electrophoretic dispersion medium $1f$ are may optionally contain a charge control agent, a charging aid, etc., as desired. Either one or both of the charge control agent and the charging aid may be added in the electrophoretic dispersion medium $1f$.

The charge control agent is not particularly limited so long as it is soluble in the electrophoretic dispersion medium $1f$.

Examples thereof may include known charge control agents including: naphthenic acid-based metallic soaps, such as cobalt naphthenate, zirconium naphthenate, copper phthenate, iron naphthenate, lead naphthenate, manganese naphthenate, zinc naphthenate; octenic acid-based metallic soaps, such as cobalt actenate, zirconium octenate, iron octenate, lead octenate, nickel octenate, manganese octenate, and zinc octenate; metallic soaps, such as stearic acid-based metallic soaps; polyaminopolybutenylsuccinimide; lecithin; etc. Of these the metallic soaps are preferred. An addition amount of the charge control agent may appropriately be determined depending on the kinds thereof but may preferably be 0.0001-5 wt. %, more preferably 0.001-1 wt. %, per the electrophoretic dispersion medium $1f$.

As the charging aid, it is possible to use a rosin ester or a resin derivative. The rosin ester or rosin derivative is not particularly limited so long as it is soluble in the electrophoretic dispersion medium $1f$. Examples thereof may include: gum rosin, wood rosin, tall oil rosin, rosin-modified maleic acid, rosin-modified pentaerythritol, rosin glycerinate, partially hydrogenated rosin methylate, partially hydrogenated rosin glycerinate, partially hydrogenated rosin triethyleneglycol ester, completely hydrogenated rosin pentaerythritol ester, maleic acid-modified rosin ester, fumaric acid-modified rosin ester, acrylic acid-modified rosin ester, maleic acid-modified pentaerythritol ester, fumaric acid-modified pentaerythritol ester, acrylic acid-modified rosin pentaerythritol ester, maleic acid-modified rosin glycerinate, fumaric acid-modified rosin glycerinate, and acrylic acid-modified rosin glycerinate. An addition amount of the charging aid may appropriately be determined depending on the kinds thereof but may preferably be 0.001-10 wt. %, more preferably 0.01-5 wt. %, per the electrophoretic dispersion medium $1f$.

The electrophotographic particles $1e$ may preferably have a concentration of 1-40 wt. %, more preferably 3-20 wt. %, per the weight of the electrophoretic dispersion medium $1f$ although the concentration varies depending on hue and particle size of the electrophoretic particles $1e$. When the electrophotographic particles have the concentration of less than 1 wt. %, a display contrast of the electrophotographic particles $1e$ is undesirably lowered. When the concentration of the electro-photographic particles exceeds 40 wt. %, a display contrast of the colored electrophoretic dispersion medium $1f$ is undesirably lowered.

(Electrophoretic Display)

Figure 2:
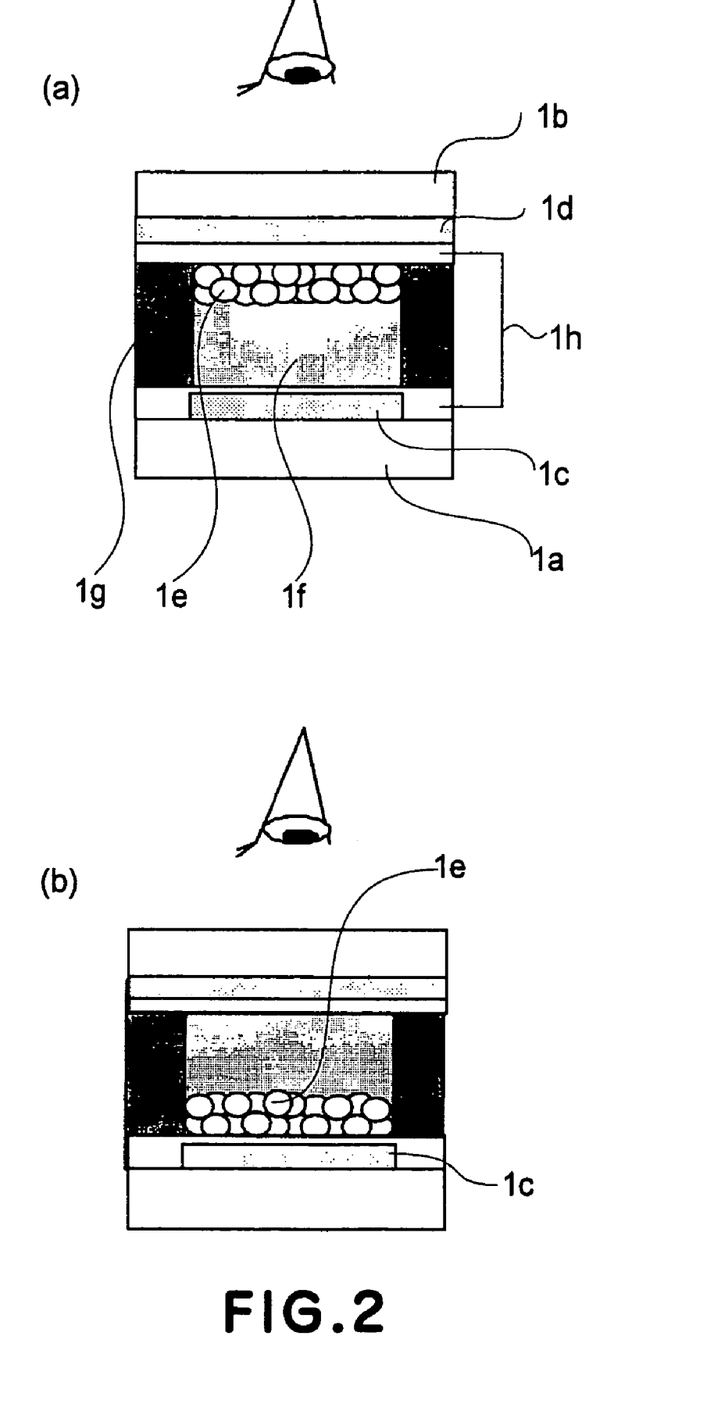
FIGS. 2(a) and 2(b) are schematic views showing a display embodiment of the electrophoretic display device.

A display example of the electrophoretic display device using the electrophotographic particles $1e$ of the present invention is shown in FIGS. 2(a) and 2(b), wherein an electrophoretic dispersion liquid comprising white electrophotographic particles 1e and an electrophoretic dispersion medium 1f colored with a blue dye is filled in a cell. In these figures, the electrophotographic particles 1e are negatively charged. When the second electrode 1d is 0 V and the first electrode 1c is supplied with a voltage of a negative polarity, the electrophotographic particles 1e are collected to the second electrode 1d. As a result, when the cell is viewed from above, the cell looks white due to distribution of the white electrophotographic particles 1e. On the other hand, when the second electrode 1d is 0 V and the first electrode 1c is supplied with a voltage of a positive polarity, the electrophotographic particles 1e are collected to the first electrode 1c. As a result, when the cell is viewed from above, the cell looks blue. By carrying out such a drive on a pixel-by-pixel basis, it is possible to display arbitrary image and character at a multiplicity of pixels.

Hereinbelow, another embodiment of an electrophoretic display device using electrophoretic particles of the present invention will be described with reference to the drawings.

Figure 3:
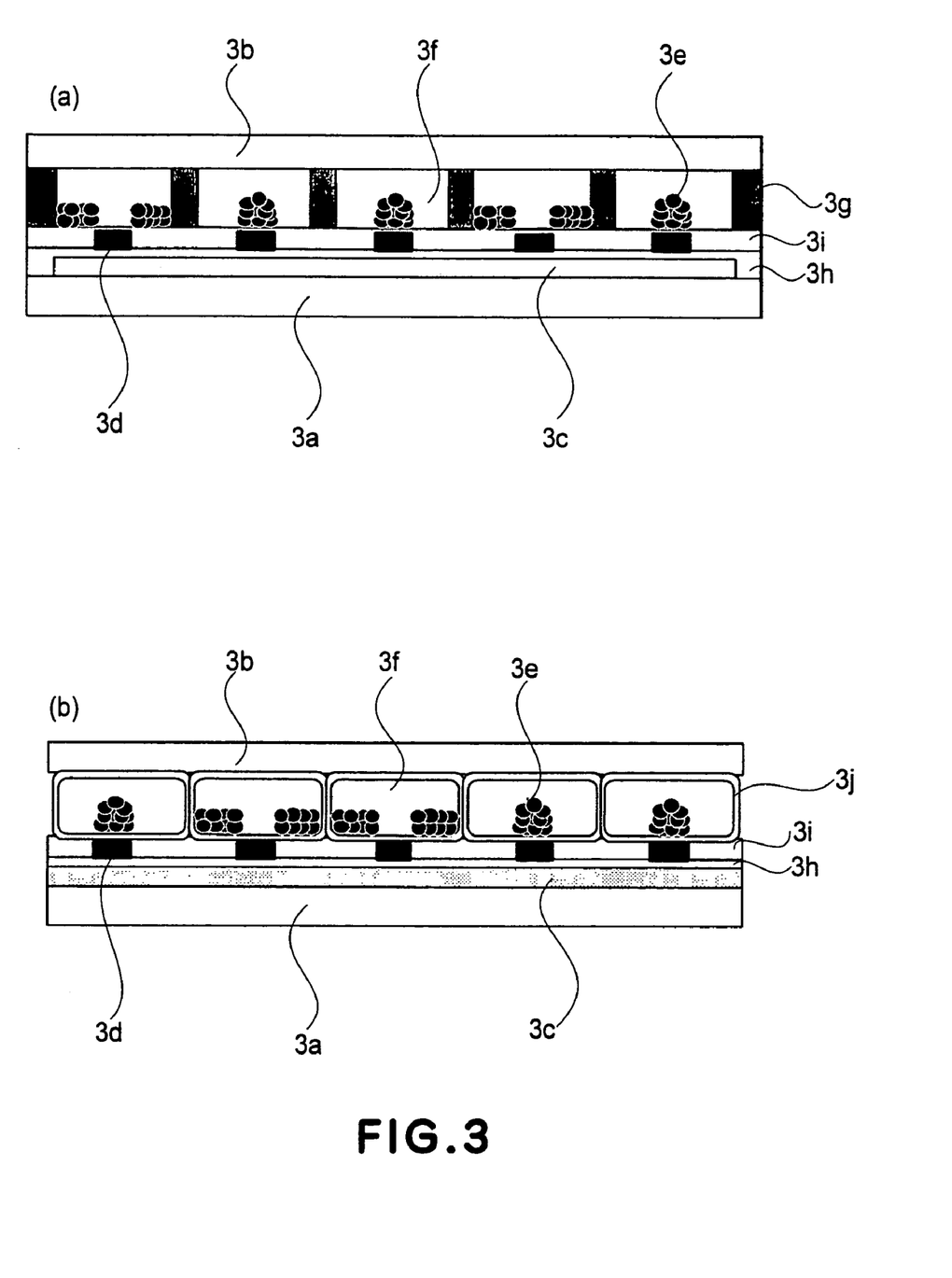
FIGS. 3(a) and 3(b) are schematic sectional views showing another embodiment of an electrophoretic display device using electrophoretic particles of the present invention.

FIGS. 3(a) and 3(b) are schematic sectional views each showing another embodiment of an electrophoretic display device using the electrophotographic particles of the present invention.

As shown in FIG. 3(a), the electrophoretic display device includes a first substrate 3a on which a first electrode 3c and a second electrode 3d are disposed. Between the electrodes 3c and 3d and on the second electrode 3d, an insulating layer 3h and an insulating layer 3i are formed, respectively. The insulating layer 3h formed between the electrodes 3c and 3d may be colored or may be colorless and transparent, but the insulating layer 3i is colorless and transparent.

The electrophoretic display device further includes a second substrate 3b disposed opposite to the first substrate 3a with a spacing through a partition wall 3g. In a cell (space) defined by the pair of first and second substrates 3a and 3b and the partition wall 3g, an electrophoretic dispersion liquid comprising at least electrophoretic particles 3e and an electrophoretic dispersion medium 3f is sealed. A display surface of the electrophoretic display device is located on the second substrate 3b side.

FIG. 3(b) shows an electrophoretic display device using microcapsules. On a first substrate 3a, a plurality of microcapsules 3i each containing the electrophoretic dispersion liquid are disposed and covered with a second substrate 3b. In the case of using the microcapsules, an insulating layer 3i may be omitted.

In FIGS. 3(a) and 3(b), the second electrode 3d comprises a plurality of electrode portions as pixel electrodes capable of independently applying a described electric field to the electrophoretic dispersion liquid in each cell (or each microcapsule), and the first electrode 3c is a common electrode through which the same potential is applied to the entire display area.

As described in the above-mentioned embodiment, the second electrode 3c (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 3e) in each of the cells groups.

The electrophoretic particles 3e in each individual cell (or microcapsule) are controlled by an electric field applied through the second electrode 3c, whereby at each pixel, the color (e.g., black) of the electrophoretic particles 3e and the color (e.g., white) of the insulating layer 3h are selectively displayed. By effecting such a drive on a pixel-by-pixel basis, it is possible to effect display of arbitrary images and characters by use of corresponding pixels 3.

Hereinbelow, constitutions, materials, production processes in this embodiment will be described.

(Constitution of Electrophoretic Display Device)

The first substrate 3a is formed of any insulating member, for supplying the electrophoretic display device, such a glass, plastic, or the like.

The second substrate 3b may be a transparent substrate or a transparent plastic substrate.

The first electrode 3c is a metal electrode of, e.g., Al exhibiting light reflection performance.

The insulating layer 3h formed on the first electrode 3c is formed of a mixture of a transparent colorless insulating resin with light scattering fine particles of, e.g., aluminum oxide or titanium oxide. As a material for the transparent colorless insulating resin, it is possible use the above described insulating resins. Alternatively, it is also possible to use a light scattering method utilizing unevenness at the surface of the metal electrode without using the fine particles.

The second electrode 3d is formed of an electroconductive material, which looks dark black from the viewer side of the electrophoretic display device, such as titanium carbide, black-treated Cr, and Al or Ti provided with a black surface layer. Pattern formation of the second electrode 5 may be performed through a photolithographic process.

On the second electrode 3d, the insulating layer 3i is formed of, e.g., the transparent colorless insulating resin described above.

In this embodiment, a display contrast is largely depend on an areal ratio between the second electrode 3d (each electrode portion) and an associated pixel, so that an exposed area of the second electrode 3d is required to be smaller than that of the pixel in order to enhance a contrast. For this reason, it is preferable that the areal ratio therebetween may ordinarily be 1:2 to 1:5.

The partition wall 3g may be formed in the same manner as described above. The method of filling the above described electrophoretic dispersion liquid in the cell is not limited particularly but may be the above described ink jet method using nozzles.

(Microcapsule)

The microcapsule 3j containing the electrophoretic dispersion liquid can be prepared by the known method as described above, such as interfacial polymerization, in situ polymerization, coacervation, and so on. The material for forming the microcapsule 3j may be the same polymer as described above.

The method of forming the microcapsules 3j on the first substrate 3a is not particularly restricted but may be the above described ink jet method using nozzles.

Incidentally, in order to prevent positional deviation of the microcapsule 3j disposed on the substrate, as described above, a light-transmissive resin binder may be filled in a gap between adjacent microcapsules to fix the microcapsules on the substrate. As the resin binder, it is possible to use the above described resins.

In the case of sealing a spacing between the first and second substrates 3a and 3b, the spacing may preferably be sealed under pressure so that the microcapsule 3j has such a shape that a horizontal length is longer than a vertical length with respect to the first substrate 3a (FIG. 3(b)).

(Electrophoretic Dispersion Medium)

As the electrophoretic dispersion medium 3f, it is possible to use the above described liquids.

(Electrophoretic Particles) As the electrophoretic particles 3e, it is possible to use black particles obtained by the above described method. In this embodiment, a concentration of the electrophotographic particles 3e varies depending on the particle size thereof but may preferably 0.5-10 wt. %, more preferably 1-5 wt. %, per the weight of the electrophoretic dispersion medium 3f. When the concentration of the electrophotographic particles 3e is less than 0.5 wt. %, the first electrode 3c cannot be covered completely, so that a display contrast is undesirably lowered. Further, when the concentration of the electrophotographic particles 3e exceeds 10 wt. %, the electrophotographic particles extend off the colored second electrode 3d, thus undesirably lowering the display contrast.

Figure 4:
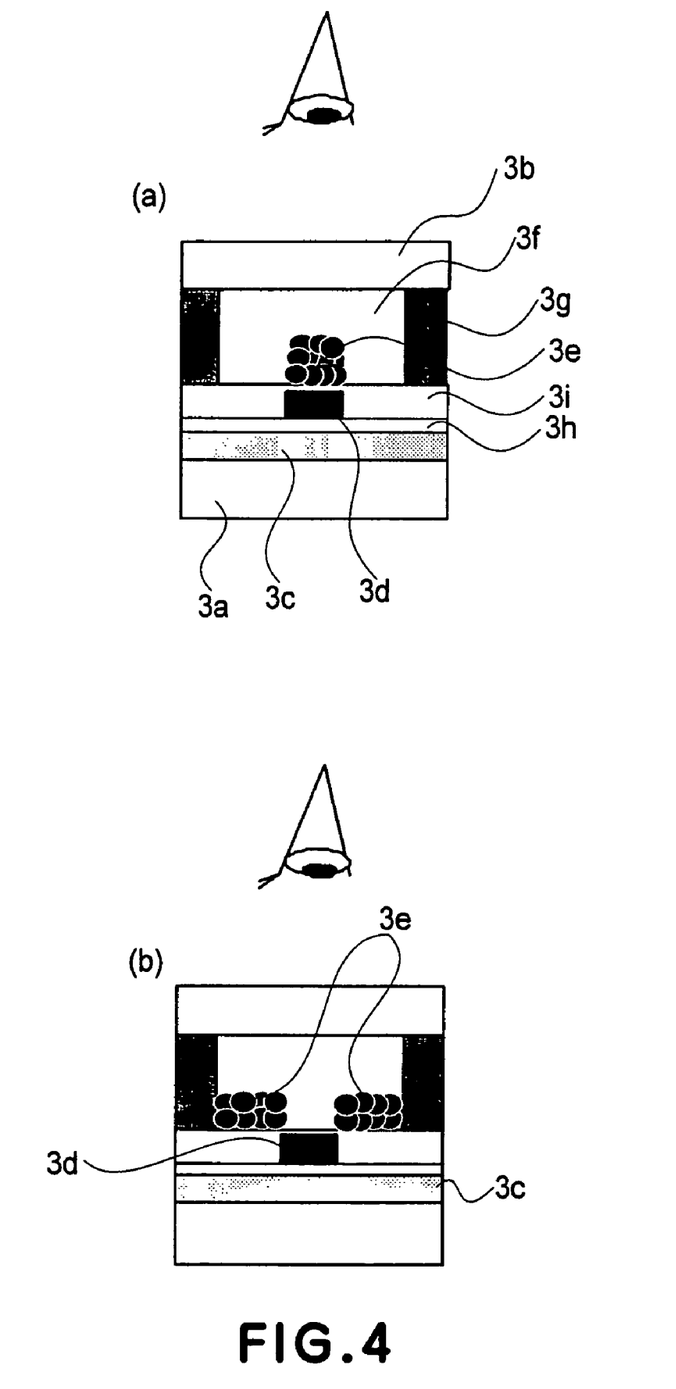
FIGS. 4(a) and 4(b) are schematic views showing a display embodiment of the electrophoretic display device of Second Embodiment.

A display embodiment of the electrophoretic display device using the electrophoretic particles according to this embodiment is shown in FIGS. 4(a) and 4(b).

FIGS. 4(a) and 4(b) illustrate a display example wherein, e.g., an electrophoretic dispersion liquid comprising black electrophoretic particles 3e and a colorless and transparent electrophoretic dispersion medium 3f is filled in a cell. The electrophoretic particles 3e is negatively charged.

In the case where the color of the surface of the insulating layer 3a is white and the color of the surface of the second electrode 3d is black, when the electrophoretic particles 3e are collected on the surface of the second electrode 5 as shown in FIG. 4(a) by applying a positive-polarity voltage to the second electrode while keeping the voltage of the first electrode 3c at 0 V, the cell looks white when viewed from above. On the other hand, when the electrophoretic particles 3e are collected on the surface of the first electrode 3c as shown in FIG. 4(b), by applying a negative-polarity voltage to the second electrode while keeping the voltage of the first electrode 3c at 0 V, the cell looks black when viewed from above. By performing such a drive on a pixel-by-pixel basis, it is possible to display an arbitrary image or character by use of a multiplicity of pixels.

Hereinbelow, the present invention will be described more specifically based on Examples but the present invention is not limited thereto.

EXAMPLE 1

A polymerizable monomer comprising 196 wt. parts of styrene containing 16 wt. parts of benzoyl peroxide, and 4 wt. parts of isopropenyloxazoline is added in 400 wt. parts of 0.05 wt. %-polyvinyl alcohol solution and stirred at high speed to prepare a uniform suspension liquid, followed by polymerization at 80° C. for 7 hours in a nitrogen atmosphere. The resultant polymer is separated and purified to obtain a styrene copolymer having oxazoline group as a reactive group. By using a kneader, 40 wt. parts of the styrene copolymer and 25 wt. parts of titanium oxide particles (average particle size: 80 nm) having hydroxyl group as a functional group are reacted with each other for 20 minutes under a kneading condition of 150° C. and 90 rpm. The reaction product is cooled and then pulverized to obtain styrene copolymer-grafted titanium oxide.

A core composition comprising 30 wt. parts of titanium oxide particles to which the styrene copolymer is grafted, 1.7 wt. parts of 2,2'-azobisisobutyronitrile (AIBN), 130 wt. parts of 4-ethylstyrene, and 2 wt. parts of divinylbenzene, by a homogenizer. In a dispersion medium comprising 400 wt. parts of a sodium dodecyl sulfonate aqueous solution (concentration: 0.05 wt. %) and 20 wt. parts of calcium phosphate dispersed therein, the suspension liquid is added. The resultant liquid is stirred at high speed by the homogenizer to prepare a uniform suspension liquid. The suspended core composition has an average particle size of about 2.0 μm. Thereafter, the uniform suspension liquid is subjected to polymerization at 80° C. in a nitrogen atmosphere to obtain core particles.

When a polymerization conversion rate of the polymerizable monomer for core reaches about 90%, a shell layer is formed. An aqueous dispersion liquid of a polymerizable monomer for shell is prepared by finely dispersing 5 wt. parts of dodecyl methacrylate as the polymerizable monomer for shell in 100 wt. parts of ion-exchanged water by an ultrasonic emulsifying machine. At this time, the polymerizable monomer for shell has an average droplet size of about 0.1 μm. After the aqueous dispersion liquid is added in the reaction system, an aqueous solution of 0.03 wt. part of potassium persulfate as a polymerization initiator for shell in 40 wt. parts of ion-exchanged water is added in the reaction system. Then, the polymerization is further continued for 5 hours.

After the polymerization, the resultant polymer particles are washed, followed by drying and classification to obtain objective electrophoretic particles 1e. An average particle size of the electrophoretic particles is about 2.1 μm.

The thus prepared electrophoretic particles 1e are subjected to metal coating to be embedded in epoxy resin and cut into a 1 mm-thick layer by a microtome. When the cut surface is observed through a transmission-type electron microscope, it is possible to confirm that the titanium oxide particles are uniformly dispersed in the polymer fine particles and the shell layer having a thickness of about 0.1 μm is formed at the core surface.

An electrophoretic dispersion liquid is prepared by using 5 wt. % of the electrophoretic particles 1e (white particles), 0.1 wt. % of a colorant ("Oil Blue N", mfd. by Aldrich Co.), 2.5 wt. % of rosin ester charging aid; Neotol 125H", mfd. by Harima Chemicals, Inc.), and 92.4 wt. % of an electrophoretic dispersion medium 1f ("Isoper H, mfd. by Exxon Corp.).

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display by driving it at a drive voltage of ±10V, the electrophoretic particles 1e are excellent in a degree of coloring and dispersibility, and it is possible to effect clear blue/white display.

EXAMPLE 2

A plurality of microcapsules 1i each containing an electrophoretic dispersion liquid prepared in the same manner as in Example 1 are prepared by in-situ polymerization method. Each microcapsule is formed of urea-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display by driving it at a drive voltage of 10 V, the electrophoretic particles 1e are excellent in a degree of coloring and dispersibility, and it is possible to effect clear blue/white display.

EXAMPLE 3

A polymerizable monomer comprising 195 wt. parts of styrene containing 16 wt. parts of benzoyl peroxide, and 5 wt. parts of glycidyl methacrylate is added in 400 wt. parts of 0.05 wt. %-polyvinyl alcohol solution and stirred at high speed to prepare a uniform suspension liquid, followed by polymerization at 80° C. for 7 hours in a nitrogen atmosphere. The resultant polymer is separated and purified to obtain a styrene copolymer having epoxy group as a reactive group. By using a kneader, 40 wt. parts of the styrene copolymer and 20 wt. parts of carbon black particles (average particle size: 22 nm) having hydroxyl group and carboxyl group as a functional group are reacted with each other for 20 minutes under a kneading condition of 150° C. and 100 rpm. The reaction product is cooled and then pulverized to obtain styrene copolymer-grafted carbon black.

A core composition comprising 30 wt. parts of carbon black particles to which the styrene copolymer is grafted, 1.7 wt. parts of 2,2'-azobisisobutyronitrile (AIBN), 130 wt. parts of 4-ethylstyrene, and 2 wt. parts of divinylbenzene, by a homogenizer. In a dispersion medium comprising 1800 wt. parts of a sodium dodecyl sulfonate aqueous solution (concentration: 0.05 wt. %) and 90 wt. parts of calcium phosphate dispersed therein, the suspension liquid is added. The resultant liquid is stirred at high speed by the homogenizer to prepare a uniform suspension liquid. The suspended core composition has an average particle size of about 1.5 μm. Thereafter, the uniform suspension liquid is subjected to polymerization at 80° C. in a nitrogen atmosphere to obtain core particles.

When a polymerization conversion rate of the polymerizable monomer for core reaches about 90%, a shell layer is formed. An aqueous dispersion liquid of a polymerizable monomer for shell is prepared by finely dispersing 5 wt. parts of dodecyl methacrylate as the polymerizable monomer for shell in 100 wt. parts of ion-exchanged water by an ultrasonic emulsifying machine. At this time, the polymerizable monomer for shell has an average droplet size of about 0.1 μm. After the aqueous dispersion liquid is added in the reaction system, an aqueous solution of 0.03 wt. part of potassium persulfate as a polymerization initiator for shell in 40 wt. parts of ion-exchanged water is added in the reaction system. Then, the polymerization is further continued for 5 hours.

After the polymerization, the resultant polymer particles are washed, followed by drying and classification to obtain objective electrophoretic particles 1e. An average particle size of the electrophoretic particles is about 1.6 μm.

The thus prepared electrophoretic particles 1e are observed through a transmission-type electron microscope in the same manner as in Example 1, it is possible to confirm that the carbon black particles are uniformly dispersed in the polymer fine particles and the shell layer having a thickness of about 0.1 μm is formed at the core surface.

An electrophoretic dispersion liquid is prepared by using 1 wt. % of the electrophoretic particles 3e (black particles), 0.5 wt. % of rosin ester charging aid; Neotol 125H", mfd. by Harima Chemicals, Inc.), and 98.5 wt. % of an electrophoretic dispersion medium 3f ("Isoper H, mfd. by Exxon Corp.).

The electrophoretic dispersion liquid is injected into a cell by using nozzles according to an ink jet method to provide an electrophoretic display device, as shown in FIG. 3(a), which is connected with a voltage application circuit.

When the resultant electrophoretic display device is subjected to contrast display by driving it at a drive voltage of ±10V, the electrophoretic particles 3e are excellent in a degree of coloring and dispersibility, and it is possible to effect clear white/black display.

EXAMPLE 4

A plurality of microcapsules 3j each containing an electrophoretic dispersion liquid prepared in the same manner as in Example 3 are prepared by interfacial polymerization method. Each microcapsule is formed of polyamide resin as a film-forming material. An electrophoretic display device, as shown in FIG. 3(b), which is connected with a voltage application circuit is prepared by disposing the plurality of microcapsules 3j on a first substrate 3a by use of nozzles according to the ink jet method.

When the resultant electrophoretic display device is subjected to contrast display by driving it at a drive voltage of 10 V, the electrophoretic particles 3e are excellent in a degree of coloring and dispersibility, and it is possible to effect clear white/black display.

As described hereinabove, the electrophoretic particles of the present invention can be utilized in an electrophoretic display device or in the field of electrophotography using liquid toner. Further, according to the present invention, it is possible to provide electrophoretic particles excellent in a degree of coloring and a dispersibility. By using the electrophoretic particles, it is possible to provide an electrophoretic display device, an electrophotographic apparatus, etc., which provide a high contrast.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 162471/2004 filed May 31, 2004, which is hereby incorporated by reference.

What is claimed is:

1. Electrophoretic particles, comprising:
   core particle fines comprising a first polymer, and
   a pigment dispersed in the core particle fines,
   wherein to the pigment, a second polymer is grafted, and at the surface of core particle, a shell layer for suppressing agglomeration of the core particle fines is disposed, and
   wherein the core particle fines have an average particle size of 0.5-10 μm.

2. Electrophoretic particles according to claim 1, wherein the second polymer has an affinity for a polymerizable monomer for the first polymer.

3. Electrophoretic particles according to claim 1, wherein the electrophoretic particles are to be dispersed in an electrophoretic dispersion medium and the shell layer comprises a polymer which has an affinity for the electrophoretic dispersion medium.

4. A process for producing electrophoretic particles containing a pigment, comprising:
   a step of forming core particle fines by performing suspension polymerization of a composition comprising a pigment to which a polymer is grafted, a polymerization initiator, and a polymerizable monomer in a suspension medium, and
   a step of forming a shell layer for suppressing agglomeration of the core particle fines at a surface of the core particle fines,
   wherein the core particle fines have an average particle size of 0.5-10 μm.

5. An electrophoretic dispersion medium, comprising:
electrophoretic particles according to any one of claims 1-3, and
an electrophoretic dispersion medium.

6. An electrophoretic display device comprising an electrophoretic dispersion medium according to claim 5.

7. Electrophoretic particles according to claim 1, wherein the average particle size of the core particle fines is 0.5-3 µm.

8. The process according to claim 4, wherein the average particle size of the core particle fines is 0.5-3 µm.

* * * * *